Aug. 21, 1962  W. KOBER  3,050,648
ROTOR AND METHOD OF ASSEMBLY THEREOF
Filed Jan. 14, 1959

INVENTOR.
WILLIAM KOBER
BY
Beau, Brooks, Buckley & Beau.
ATTORNEYS

United States Patent Office 3,050,648
Patented Aug. 21, 1962

3,050,648
ROTOR AND METHOD OF ASSEMBLY THEREOF
William Kober, Fairport, N.Y., assignor to TKM Electric Corporation, Rochester, N.Y.
Filed Jan. 14, 1959, Ser. No. 786,796
8 Claims. (Cl. 310—156)

This invention relates generally to the dynamoelectric art, and more particularly to a new and useful rotor and method of assembling the same.

While not necessarily limited thereto, the type of rotor to which the instant invention is particularly directed comprises a rotor for machines of the axial air gap type, wherein there are provided a rotor body carrying permanent magnets extending generally lengthwise of the axis of rotor rotation, a pole piece structure at one end of the body, and a flux return end plate at the opposite end thereof. It is, of course, essential that the rotor parts be locked together in predetermined relation, and that the assembled rotor parts be properly positioned on the shaft and locked to the shaft for rotation therewith. Customarily the end plate, pole piece structure and rotor body are locked together by means of bolts, or like fastenings, and the assembled rotor is locked to the shaft by means of a lock nut, or the like.

However, in many instances fastenings such as lock nuts, screws, bolts, and the like are highly undesirable, if not entirely unsuitable, for various reasons, and indeed sometimes there is not sufficient room therefor.

Accordingly, it is a primary object of this invention to provide a rotor and method of assembling the same which securely locks the rotor parts to each other and to the shaft, in proper position thereon, without the use of fastenings such as those heretofore listed.

A rotor assembly constructed in accord with my invention is characterized by the provision of an end plate fixed to the shaft for rotation therewith, a rotor body carrying magnets positioned against the end plate, a pole piece structure at the opposite end of the rotor body, and a collar tightly gripping the shaft circumference and clamping the pole piece structure and the rotor body to each other and to the end plate, thereby clamping the pole piece structure and rotor body between the collar and the end plate and locking the assembled rotor to the shaft.

The method of assembling such a rotor in accord with my invention is characterized by positioning the end plate on the shaft and securing the same thereto for movement therewith, slip-fitting the rotor body and the pole piece structure over the shaft and against the end plate, and then shrink-fitting a collar onto the shaft and against the pole piece structure for clamping the same and the rotor body against the end plate.

The foregoing and other objects, advantages and characterizing features of a rotor and method of assembling the same in accord with my invention will become clearly apparent from the ensuing detailed description of a presently preferred embodiment thereof, taken in conjunction with the accompanying drawing illustrating the same wherein like reference numerals denote like parts throughout the various views and wherein.

Figure 1:
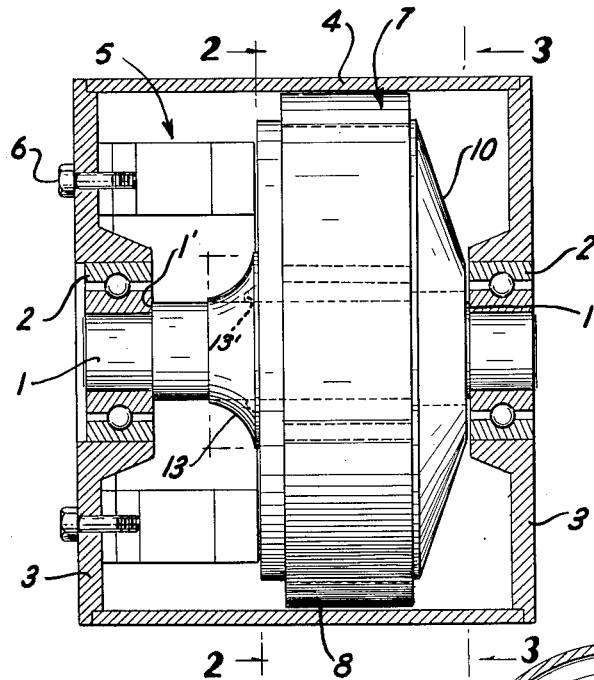
FIG. 1 is a generally somewhat diagrammatic, longitudinal sectional view of a dynamoelectric machine with the rotor of my invention shown in elevation.
Figure 3:
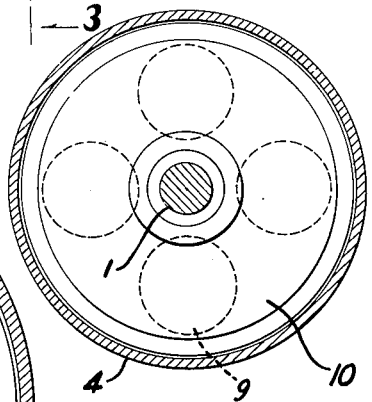
FIG. 3 is a transverse sectional view thereof, taken about on line 3—3 of FIG. 1.

Referring now to the embodiment illustrated in the accompanying drawing, there is shown an axial air gap machine having a rotor shaft 1 journalled adjacent its opposite ends in bearings 2 carried by end bells 3 which close the opposite ends of a generally cylindrical housing member 4. The shaft 1 can be shouldered, as at 1', to accurately position the same relative to the bearings 2. An armature, generally designated 5, which can be of known construction containing windings, not illustrated, is secured to one end bell 3 as by screws 6.

Figure 2:
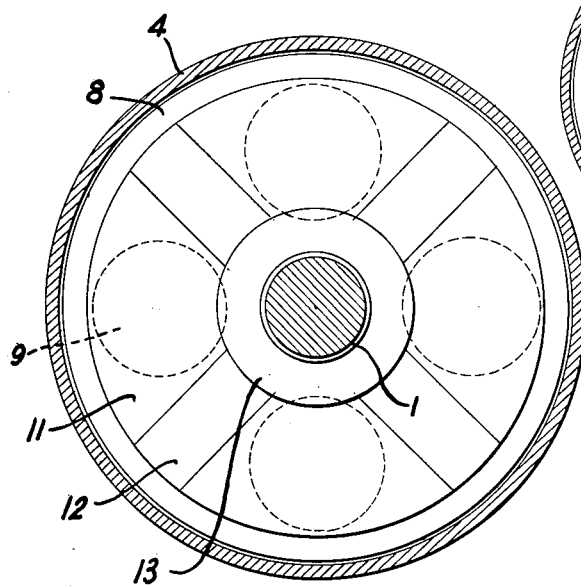
FIG. 2 is a transverse sectional view thereof, taken about on line 2—2 of FIG. 1.

My invention is particularly concerned with the rotor, generally designated 7, and which preferably comprises a body of material characterized both by a high degree of mechanical strength and a high degree of electrical conductivity, such as a wrought aluminum alloy, containing permanent magnets 9 extending generally lengthwise of the axis of rotation of shaft 1, the magnets being enclosed by the rotor body 8 all in the manner and for the reasons more fully set forth in my issued Patent 2,719,931, dated October 4, 1955. At the air gap end of magnets 9, facing armature 5, there is provided a pole piece structure comprising individual pole piece segments 11 spaced apart by non-magnetic interpoles 12, the pole pieces 11 overlying the ends of the magnets 9 as clearly illustrated in FIG. 2. A flux return path is provided by an end plate 10 of magnetic material.

It is a particular feature of this invention that, whereas normally the aforesaid rotor parts are locked together by fastenings such as bolts and the like, and are secured to the shaft as by lock nuts or the like, in my invention such fastenings are dispensed with. To this end, I first position the end plate 10 on shaft 1 and secure it thereto in any desired manner. Preferably, plate 10 is shrunk fit onto shaft 1, but it can be otherwise fixed thereto. After being secured in place the plate 10 is machined, to provide a face at right angles to the axis of shaft 1. Then, the rotor body 8, which in most cases at least will contain the magnets 9 at this point, is slipped over shaft 1 and against the face of end plate 10. The assembled pole piece structure 11, 12 then is slipped over shaft 1 against the opposite end face of the rotor body 8. The pole piece structure and rotor body are positioned relative to each other, and a heated collar 13, of non-magnetic material, then is dropped over shaft 1 and allowed to shrink in place thereon. In doing so, the collar 13 securely grips the circumference of shaft 1 and is locked thereto, just as the end plate 10 is locked to shaft 1. In addition, collar 13 clamps the pole piece structure and rotor body to each other and against the end plate 10, thereby securely locking these parts in the desired position on shaft 1 for rotation therewith.

It will be noted that end plate 10 is of frustro-conical or tapered formation, the taper serving to reduce the inertia of the rotor by shifting the weight of the end plate toward shaft 1. In addition, this produces a shorter average return flux path. The collar 13, which can be tapered and preferably is given the fillet configuration illustrated to avoid the armature windings, has a slight cupping action. That is to say, the peripheral portion of collar 13 bearing against the pole piece structure tends to be forced against the pole piece structure more than the center portion closer to shaft 1, and indeed if desired this cupping action can be exaggerated by initially forming the collar to have a somewhat cup-shaped formation, as illustrated at 13' in FIG. 1. Note also that collar 13 overlies the inner edge of each pole piece segment 11, to secure the same firmly against the end faces of magnets 9.

Accordingly, it is seen that my invention fully accomplishes its intended objects, and it will of course be appreciated that, while only one form of my invention has been illustrated and described in detail, my invention is not necessarily limited to such details. Instead, I recognize that those skilled in the art can modify and vary the same Having fully disclosed and completely described my invention, and its mode of operation, what I claim as new is:

1. A dynamoelectric rotor comprising, a shaft journaled for rotation about substantially its lengthwise axis, an end plate fixed to said shaft for rotation therewith, a rotor body carrying magnets positioned on said shaft against said end plate, a pole piece structure positioned against the opposite end of said rotor body, and a collar gripping said shaft circumferentially thereof and clamping said pole piece structure and said rotor body against said end plate for rotation therewith.

2. A rotor for a dynamoelectric machine of the axial air gap type comprising, a shaft journaled for rotation about substantially its lengthwise axis, an end plate fixed on said shaft for rotation therewith, a rotor body carrying magnets extending generally lengthwise of said shaft positioned on said shaft with one end of said magnets operatively connected to said end plate, a pole piece structure operatively connected to the opposite end of said magnets, and a collar gripping said shaft circumferentially thereof and clamping said pole piece structure and said rotor body against said end plate for rotation therewith.

3. A rotor as set forth in claim 2, wherein said collar is of generally cup-shaped formation opening along said shaft toward said pole piece structure.

4. A rotor as set forth in claim 2, wherein said end plate is externally tapered away from said rotor body.

5. A rotor as set forth in claim 2, wherein said collar is externally generally tapered away from said rotor body.

6. The method of assembling and securing to a shaft a dynamoelectric rotor of the axial air gap type having a rotor body carrying magnets extending generally in the direction of the shaft, an end plate at one end of the body, and a pole piece structure at the other end thereof, which method comprises, fixing the end plate in position on the shaft, forming the end plate to provide a face at right angles to the shaft to receive the rotor body and position the same on the shaft, slip-fitting the rotor body over the shaft and against the end plate, slip-fitting the pole piece structure over the shaft and against the rotor body, and shrink-fitting a clamping collar on the shaft tightly against the pole piece structure.

7. A dynamoelectric rotor comprising, a shaft journaled for rotation about substantially its lengthwise axis, an end plate fixed to said shaft for rotation therewith, a magnet carrying rotor body positioned on said shaft against said end plate, a pole piece structure positioned on the opposite end of said rotor body, and a collar frictionally gripping said shaft circumferentially thereof in clamping engagement therewith, said collar holding said pole piece structure and said rotor body against said end plate for rotation therewith.

8. A dynamoelectric rotor as set forth in claim 7, wherein said collar is shrunk fitted on said shaft.

References Cited in the file of this patent

UNITED STATES PATENTS

| | | |
|---|---|---|
| 2,190,956 | Tognola | Feb. 20, 1940 |
| 2,335,378 | Bernard | Nov. 30, 1943 |
| 2,637,825 | Moore | May 5, 1953 |
| 2,719,931 | Kober | Oct. 4, 1955 |
| 2,861,205 | Kober | Nov. 18, 1958 |

FOREIGN PATENTS

| | | |
|---|---|---|
| 725,895 | Great Britain | July 9, 1953 |